April 16, 1935.　　　R. ERLING　　　1,998,189

CONTROL MECHANISM FOR HYDRAULIC DEVICES

Filed March 17, 1934

INVENTOR
RALPH ERLING

BY
Harold Dodd
ATTORNEY

Patented Apr. 16, 1935

1,998,189

UNITED STATES PATENT OFFICE 1,998,189

CONTROL MECHANISM FOR HYDRAULIC DEVICES

Ralph Erling, Alexandria, Va.

Application March 17, 1934, Serial No. 716,144

18 Claims. (Cl. 60—52)

(Filed but not issued under the act of March 3, 1883, as amended April 30, 1928; 370 O. G. 757)

This invention relates to means for controlling the work performed by hydraulic devices, such as variable delivery hydraulic pumps used for actuating the steering gears of ships, gun turrets, etc.

Among the objects of this invention are:

To provide a device of the type mentioned that will have fewer parts than previously known mechanisms of this kind but will be more satisfactory in operation;

To make possible the adjustment of the stroke of a variable delivery hydraulic pump to compensate for wear;

To provide a simpler torque equalizer and a more satisfactory interrupted gear;

To provide a much simplified servo motor directly connected to the stroke changing mechanism of the pump.

It is well known that considerable difficulty has heretofore been met in designing mechanism for operating steering gears that will meet satisfactorily the requirement of putting the rudder over in the required time, due to uncertainty of some factors such as pump leakage, friction in the piping between the pump and the rams, etc., which vary with each installation.

The horsepower required of the motor is a function of the oil delivered by the pump in a fixed time. It is therefore apparent that some means of adjusting the maximum stroke of the pump must be provided if overloading of the motor is to be prevented and the greatest steering efficiency secured. As the pump wears in service the leakage becomes greater with the result that a longer time is required to move the rudder. The present invention provides for increasing the stroke of the pump to compensate for such leakage and thereby keep the time for moving the rudder within the limit originally set.

Figure 1:
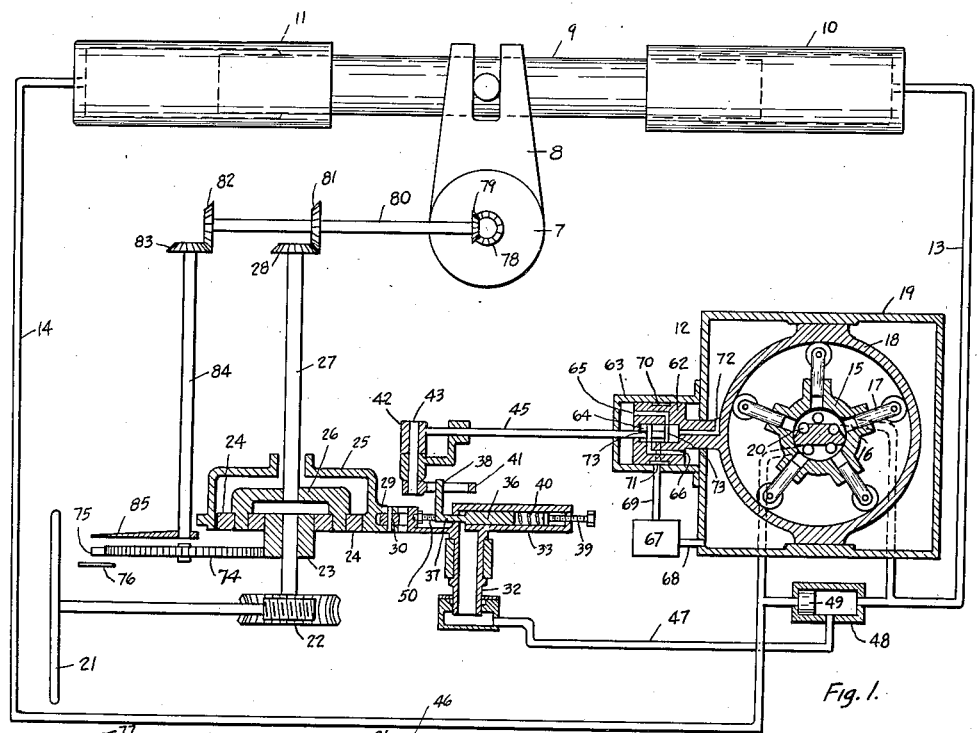
Fig. 1 shows diagrammatically the arrangement of the units of a steering gear embodying my invention with several of the parts thereof in section.
Figure 2:
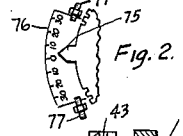
Fig. 2 is a detail view of an indicator which serves as a limit stop to the movement of the manually operated wheel.
Figure 3:
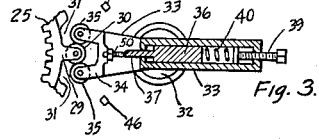
Fig. 3 is a detail plan view, partly in section, of the rotary torque equalizer of my invention.

In Fig. 1 the rudder stock, indicated by numeral 7, is connected by a yoke 8 to the ram 9 which has an end operable in each of two cylinders 10 and 11. Variable delivery hydraulic pump 12 is connected by pipes 13 and 14 to supply fluid to the cylinders 10 and 11 to operate the ram 9. The pump as shown is of the radial piston type having a rotatable member 15 wherein are formed a plurality of cylinders 16 to receive pistons 17 and a member 18 slidable in pump housing 19 to change the stroke of the pistons 17 by being moved to positions eccentric with respect to member 15. The fluid passes to and from cylinders 16 through ports 20 that are suitably connected to pipes 13 and 14 in a manner well known in this type of pump.

Manually operable wheel 21 is connected through worm gearing 22 to a gear 23 of a differential gear mechanism having planet pinions 24 meshed with gear 23 and also meshed with internal teeth on the member 25, the planet pinions 24 being carried by a member 26 to which is secured one end of shaft 27 having a beveled gear 28 at its other end. On the exterior of member 25 are spaced ears 29 between which is mounted a roller 30, there being a depression 31 at each side of the ears 29. A hollow shaft 32 is rotatably mounted adjacent member 25 and has fixed to it at its upper end a member 33 carrying spaced apart arms 34 in each of which is rotatably mounted a roller 35. Also carried by shaft 32 is a cylinder 33 having one end in communication with shaft 32. In cylinder 33 is a piston 36 having a steam 37 extending through the end wall of the cylinder, the stem having a laterally turned portion 38. A screw 39 is threaded in the end wall of cylinder 33 and bears against a spring 40 that tends to move piston 36 toward the end of the cylinder that is in communication with shaft 32. Arms 41 and 42, each of which has in it a longitudinal slot, are connected to a common pivot 43 to rotate therewith and form in effect a bell crank lever, the laterally turned portion 38 of stem 37 extending into the slot in arm 41 and a pin 44 connected to pump control spindle 45 being disposed in the slot in arm 42.

It is apparent that rotation of member 25 by means of wheel 21 will displace member 33 laterally and the rotational movement of laterally turned portion 38 thereby produced will be transmitted to arm 41 which will move arm 42 and cause control spindle 45 to be moved longitudinally. During a limited portion of the rotation of member 25 the member 33 will be rotated but as soon as roller 30 is moved out of contact with the rollers 35 the continued movement of member 25 will have no further effect on member 33, which permits moving the wheel 21 to any angular position within the limits of motion thereof to set the rudder at any desired angle without affecting control spindle 45 after the maximum stroke has been put on the pump. When member 33 has been moved into contact with either of the stops 46, reverse rotation of shaft 32 is prevented by contact of a roller 35 against the periphery of member 25. It has been found that an interrupted gear mechanism utilizing rollers as in the present case is preferable to one having conventional gear teeth since such teeth are likely to have burrs on their edges that will prevent the teeth from engaging properly.

The interior of shaft 32 is supplied with fluid under pressure from the pump through pipe 47 connected to a shuttle valve chamber 48 that is connected to pipes 13 and 14, the valve 49 being moved by the pressure in pipes 13 and 14 in such manner that the pressure is always applied through shaft 32 to piston 36 in the same direction. The position of the piston 36 in cylinder 33 is a function of the pressure on the fluid delivered by the pump and therefore the rotative movement imparted to arms 41 and 42 through the stem 37 and portion 38 is different for different pressures in the pipes 13 and 14 and thus the assembly of piston 36, spring 40 and cylinder 33 acts as a torque equalizer to control automatically the quantity of fluid delivered by the pump to prevent overloading the pump. The maximum rotation of arms 41 and 42 for a given rotation of shaft 32 will occur when piston 36 is nearest the end of cylinder 33 through which stem 37 passes. As above mentioned, it is desirable to change the maximum stroke to compensate for wear in the pump and this is done by means of an adjustable stop 50 that limits the outward movement of stem 37 but is movable to increase the maximum when the quantity of fluid delivered by the pump at a given length of stroke is diminished due to wear.

Figure 4:
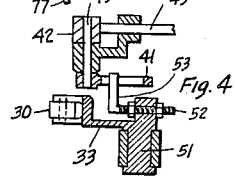
Fig. 4 is a vertical sectional view of a form of my invention similar to Fig. 3 but without the torque equalizer feature.
Figure 5:
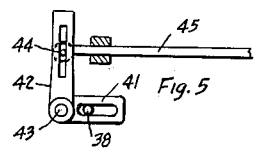
Fig. 5 is a detail plan view of a means for transmitting movement from the torque equalizer to the pump controls.
Figure 3A:
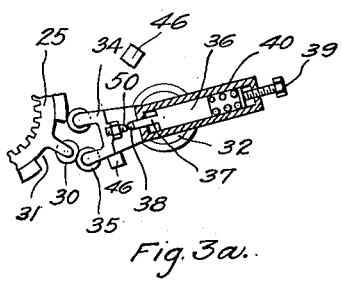

A form of my invention similar to that described but without the torque equalizer feature is shown in Fig. 4. The solid shaft 51 carries a member 33 provided with rollers 35 as above described and has fixed to it a screw threaded member 52 with a laterally turned portion 53 to engage arm 41. The position of laterally turned portion 53 with respect to the center of shaft 51 will determine the magnitude of rotation imparted to arm 41 by the shaft 51 and since 52 is adjustable in shaft 51, the maximum stroke of the pump may be varied.

Figure 6:
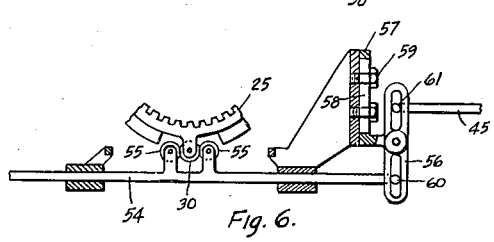
Fig. 6 illustrates the application of my interrupted gear mechanism to secure a linear motion from a rotating body.

It may be desirable in some cases to convert the rotation of member 25 into a linear movement, which is accomplished by the mechanism shown in Fig. 6. A slidably mounted rod 54 carries spaced rollers 55 that coact with the roller 30 on member 25 and cause rod 54 to be moved longitudinally by rotation of member 25. A lever 56, having a longitudinally extending slot in each end thereof is pivotally mounted intermediate its ends upon a bracket 57 that is provided with a slot 58 through which pass the bolts 59 that secure the bracket in position. A pin 60 fixed on rod 54 extends into one slot in lever 56 and a pin 61 carried by control spindle 45 extends into the other slot therein. The relative distances of the pins 60 and 61 from the pivot center of lever 56 may be changed by loosening bolts 59 and sliding the bracket 57 and thus the maximum stroke put on the pump by rotation of member 25 is varied.

The work of shifting the member 18 is performed by a device of the well known servo motor type which is, however, in the present invention, of a novel construction. Directly connected to member 18 is a piston 62 that is slidable in a cylinder 63 and has formed in it a cylinder 64. A duct 65 extends from an end face of piston 62 into cylinder 64 and a second duct 66 extends from the opposite end face of the piston into cylinder 64, liquid under pressure being supplied to cylinder 64 by an auxiliary pump 67 that draws the liquid from housing 19 through a pipe 68 and transmits it to cylinder 63 through pipe 69 that discharges into a groove 70 in the periphery of piston 62 which is in communication with cylinder 64 through a duct 71. The cylinder 64 is in communication with the interior of housing 19 through a duct 72 that opens upwardly, thereby maintaining always a head of oil in the cylinder 64 to prevent its becoming dry. Control spindle 45 is connected to a piston valve in cylinder 64, which valve has heads 73 that are spaced apart the same distance as the inner ends of ducts 65 and 66 whereby, when the spindle 45 is in the neutral position and no stroke is on the pump, these ducts will be closed by the heads 73, but when the spindle 45 is displaced from the neutral position one or the other of ducts 65 and 66 will be placed in communication with duct 71, which is so disposed that it lies always between the heads 73 and so fluid under pressure from pump 67 will be applied to act on one end or the other of piston 62 to shift the member 18 and change the pump stroke. By means of the mechanism above described the stroke of the pump may be changed without in any way affecting the extent of operation of wheel 21 which is not possible with devices for this purpose heretofore known.

A gear 74 is meshed with gear 23 and has an index 75 projecting from its periphery to move over a scale 76 and show the position to which the rudder stock 7 will be moved for any given rotation of the wheel 21, there being limit stops 77 disposed to be engaged by the index 75 to check the rotation of wheel 21 when this wheel has been turned to such position that the rudder post 7 will be turned to the maximum rudder angle in either direction. A follow-up system of well-known type consists of a bevel gear 78 concentrically mounted on rudder stock 7 and meshed with a bevel gear 79 carried by shaft 80 upon which are other bevel gears 81 and 82, the gear 81 being meshed with gear 28 to act through the differential mechanism and take stroke off the pump as is the usual practice. Beveled gear 82 is meshed with a gear 83 on shaft 84 to which is fixed an index 85 movable over scale 76 to show the angular position of rudder stock 7 at any time.

If the rudder angle is zero then all parts of the mechanism will be at their neutral positions as shown in Fig. 1. When wheel 21 is then turned shaft 27 will be held against rotation through its connection to rudder stock 7 and member 25 will be rotated through worm gearing 22, gear 23 and pinions 24 and at the same time indicator 75 will be made to move over scale 76. Turning of member 25 will, through the coaction of rollers 30 and 35, rotate shaft 32, and the roller 35 away from which the roller 30 is moving will at first swing into the depression 31 and then with continued movement of member 25 will ride on the periphery of member 25, thus permitting the wheel 21 to be turned to any desired rudder angle without increasing the pump stroke beyond the magnitude it has at the time the roller 35 begins to ride on the periphery of member 25. Since initially there will be no pressure acting on piston 36 through shaft 32 the portion 38 of stem 37 will be in its position nearest to pivot 43 and will, for a given rotation of shaft 32, impart a maximum rotation to arms 41 and 42 and through spindle 45 will move the piston valve so that one or the other of ducts 65 and 66 will be fully uncovered, thus permitting fluid from pump 67 to pass into cylinder 63 to act upon piston 62 and so shift the member 18 to put full stroke on the pump.

The pressure built up in the pump by the resistance of the load on ram 9 will be transmitted to piston 36 which will move the portion 38 away from pivot 43 and so actuate spindle 45 to take stroke off the pump when the pressure is great enough to compress spring 40. The pressure at which stroke is taken off the pump by the torque equalizer is controlled by adjusting screw 39 to change the pressure applied thereby on spring 40.

As soon as rudder stock 7 begins to rotate the follow-up mechanism acts upon member 25 to rotate it in the opposite direction and so take stroke off the pump, the gear ratios being such that when the rudder reaches the angle indicated by indicator 75 the member 25 will have been returned to neutral, the pump will cease to actuate the ram 9 and the indicator 85 will coincide with indicator 75.

The mechanisms illustrated in Figs. 4 and 6 operate as above described except that the stroke of the pump is in no way controlled by the pressure of the fluid being delivered thereby.

The invention described herein may be manufactured and used by or for the Government of the United States of America for governmental purposes without the payment of any royalties thereon or therefor.

I claim:

1. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a roller journalled in outwardly extending portions on the exterior of a member of said differential mechanism, there being in said gear member a depression at each side of said roller, a rotatably mounted hollow shaft, a cylinder mounted on said shaft having one end in communication with the interior of said shaft, a bifurcated member fixed to said shaft, a roller journalled in each arm of said bifurcation, to lie upon opposite sides of the first mentioned roller in one position of said shaft and said gear member, a piston in said cylinder, a resilient member acting upon an end of said piston to move said piston toward said communicating end of the cylinder, a stem carried by the other end of said piston extending through a wall of said cylinder and having a laterally turned portion, a bell crank lever device pivotally mounted at its elbow, there being a slot in each arm thereof, said laterally turned portion extending into one of said slots, means operatively connected to said control spindle disposed in the other of said slots, an adjustable stop carried by said bifurcated member, and means to supply fluid under pressure from said pump to said hollow shaft to act upon said piston.

2. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted hollow shaft, a roller carried by a member of said differential mechanism, two rollers operatively carried by said shaft disposed to coact with the aforesaid roller to constitute an interrupted gear device, a piston mounted on said hollow shaft with one end in communication with the interior of said shaft, a piston in said cylinder, means normally urging said piston toward the said communicating end of the cylinder, means to supply fluid under pressure from said pump to act on said piston, a stem carried by said piston extending through a wall of said cylinder and having a laterally turned portion, means connecting said laterally turned portion to said control spindle to convert rotary movement of said portion when said shaft is rotated into linear motion of said spindle, and adjustable means to limit the movement of said piston toward the communicating end of the cylinder by the above mentioned means to move said piston.

3. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted hollow shaft, a roller carried by a member of said differential mechanism, two rollers operatively carried by said shaft disposed to coact with the aforesaid roller to constitute an interrupted gear device, a piston mounted on said hollow shaft with one end in communication with the interior of said shaft, a piston in said cylinder, means normally urging said piston toward the said communicating end of the cylinder, means to supply fluid under pressure from said pump to act on said piston, a stem carried by said piston extending through a wall of said cylinder and having a laterally turned portion means connecting said a laterally turned portion to said control spindle to cause rotary movement of said portion due to rotation of said shaft to actuate said spindle, and adjustable means to limit the movement of said piston toward the communicating end of said cylinder.

4. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, a roller carried by a member of said differential mechanism, two rollers operatively carried by said shaft disposed to coact with the aforesaid roller to constitute an interrupted gear device, a member mounted on said shaft to extend substantially radially thereof and having a laterally turned portion extending substantially parallel to said shaft, said member being adjustable to vary the distance of said portion from the center of said shaft, a bell crank device pivotally mounted at its elbow and having a slot in each arm thereof, said laterally turned portion extending into one of said slots, and a member extending into the other of said slots operatively connected to said spindle.

5. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, a roller carried by a member of said differential mechanism, two rollers operatively carried by said shaft disposed to coact with the aforesaid roller to constitute an interrupted gear device, a member mounted on said shaft to extend substantially radially thereof and having a laterally turned portion extending substantially parallel to said shaft, said member being adjustable to vary the distance of said portion from the center of said shaft, and means operatively connected to said laterally turned portion and to said spindle to convert rotary movement of said portion due to rotation of said shaft into linear movement of said spindle.

6. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, a roller carried by a member of said differential mechanism, two rollers operatively carried by said shaft disposed to coact with the aforesaid roller to constitute an interrupted gear device, a member mounted on said shaft to extend substantially radially thereof and having a laterally turned portion extending substantially parallel to said shaft, said member being adjustable to vary the distance of said portion from the center of said shaft, and means operatively connected to said laterally turned portion and to said spindle whereby movement of said portion due to rotation of said shaft is transmitted to actuate said spindle.

7. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, operative connecting means between said differential mechanism and said shaft to impart to said shaft a limited rotational movement while leaving said differential mechanism free to continue its rotation, a member mounted on said shaft to extend substantially radially thereof and having a laterally turned portion extending substantially parallel to said shaft, said member being adjustable to vary the distance of said portion from the center of said shaft, a bell crank device pivotally mounted at its elbow and having a slot in each arm thereof, said laterally turned portion extending into one of said slots, and a member extending into the other of said slots and operatively connected to said spindle.

8. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, operative connecting means between said differential mechanism and said shaft to impart to said shaft a limited rotational movement while leaving said differential mechanism free to continue its rotation, a member mounted on said shaft to extend substantially radially thereof and having a laterally turned portion extending substantially parallel to said shaft, said member being adjustable to vary the distance of said portion from the center of said shaft, and means operatively connected to said laterally turned portion and to said spindle whereby movement of said portion due to rotation of said shaft is transmitted to actuate said spindle.

9. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a rotatably mounted shaft, operative connecting means between said differential mechanism and said shaft to impart to said shaft a limited rotational movement while leaving said differential mechanism free to continue its rotation, and interconnecting means between said shaft and said spindle whereby said spindle is actuated by said shaft, said last means including an element rotatable with said shaft and adjustable to vary the limiting position of said spindle.

10. The combination with a rotatable member and means to rotate said member including a variable delivery pump having control means to control delivery of fluid by said pump, means to actuate said control means including a rotatable mounting and an element slidable in said mounting transversely to the axis of rotation thereof, means tending normally to slide said element in one direction, adjustable means to limit the movement of said element by the last mentioned means, and means to supply fluid under pressure from said pump to move said element in the opposite direction; mechanism to impart a limited rotational movement to said element while being free to continue in operation after said element has reached such limit, manual means to actuate said mechanism, a follow-up driven by said member connected to actuate said mechanism oppositely to said manual means, an indicating device connected to said manual means to show the angular position to which said member will be moved at each stage of operation of said manual means, stops engageable by a portion of said indicating device to limit the operation of said manual means, and a second indicating device driven from said follow-up to show the angular position of said member.

11. The combination with a rotatable member and means to rotate said member including a variable delivery pump having control means to control delivery of fluid by said pump, of means to actuate said control means including a rotatably mounted element movable longitudinally of itself in its rotatable mounting, means tending normally so to move said element longitudinally in one direction, adjustable means to limit the movement of said element by the next preceding means, and means to supply fluid under pressure from said pump to move said element in the opposite direction; mechanism to impart a limited rotational movement to said element while being free to continue in operation after said element has reached such limit, manual means to actuate said mechanism, and a follow-up driven by said member connected to actuate said mechanism oppositely to said manual means.

12. In combination, a rotatable member, means to rotate said member, mechanism to control the rotation of said member by said means, manually operable means to actuate said mechanism, a follow-up driven by said member also connected to actuate said mechanism, an indicating device connected to said manually operable means to show the angular position to which said member will be moved at each stage of operation of said manual means, stops engageable by a portion of said indicating device to limit the operation of said manual means, and a second indicating device to show the angular position of said member.

13. In combination, a rotatable member, means to rotate said member, mechanism to control the rotation of said member by said means, manually operable means to actuate said mechanism, a follow-up driven by said member also connected to actuate said mechanism, an indicating device connected to said manually operable means to show the angular position to which said member will be moved at each stage of operation of said manual means, and stops engageable by a portion of said indicating device to limit the operation of said manual means.

14. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a roller journalled in outwardly extending portions on the exterior of a member of said differential mechanism, there being in said gear member a depression at each side of said roller, a member mounted for sliding movement, two rollers carried by said sliding member to lie upon opposite sides of the first mentioned roller in one position of the foregoing parts, a bracket mounted to be adjustable toward and away from the said sliding member, a lever pivotally mounted on said bracket intermediate the ends of said lever and having a slot in each end thereof, a member connected to said sliding member disposed in one of said slots and a member connected to said spindle disposed in the other of said slots.

15. The combination with a rotatable member and means to rotate said member including a variable delivery hydraulic pump having a control spindle to control delivery of fluid by said pump, of a differential gear mechanism, a follow-up driven by said member and manually operable means both connected to operate said differential gear mechanism, a member mounted for sliding movement, operative connecting means between a member of said differential gear mechanism and said sliding member to impart to said sliding member a limited movement while leaving said differential mechanism free to continue rotating after the limit of such sliding movement has been reached, and interconnecting means between said sliding member and said spindle to cause movement of said sliding member to actuate said spindle, including an element adjustable to vary the limiting positions to which said spindle is moved by said sliding member.

16. The combination with a rotatable member and means to rotate said member including a variable delivery hydraulic pump, of a follow-up driven by said member, manually operable means, mechanism operable by both the follow-up and the manually operable means, a rotatable shaft, connecting means between said mechanism and said shaft to impart to the shaft a limited rotation while leaving said mechanism free to continue in operation, a torque equalizer carried by the shaft, means operatively connecting the torque equalizer to said pump to vary the stroke of the pump, and means adjustable to vary the limiting position of an element of the torque equalizer to change the maximum stroke of the pump.

17. In combination, a follow-up device, manually operable means, mechanism operable by both said follow-up and said manually operable means, a variable delivery hydraulic pump having means to vary the stroke thereof and a housing adapted to contain fluid, a piston connected to said stroke varying means, a cylinder in which said piston is slidable; said piston having formed in it a cylinder, a duct extending from each end face thereof to a point in the cylinder therein which said points are spaced apart, a duct communicating with the cylinder in said piston and opening upwardly into said housing and a duct to supply fluid to the cylinder therein at a point substantially midway between the said points; a piston valve in the cylinder in said piston having two heads spaced to cover simultaneously the openings of the first two ducts into the cylinder, and means operatively connecting said piston valve to said mechanism.

18. Mechanism to control a variable delivery hydraulic pump having means to vary the stroke thereof and a housing adapted to contain fluid, comprising a piston connected to the stroke varying means, said piston having in it a cylinder, a duct extending from each end face of the piston to a point in the cylinder which said points are longitudinally spaced apart, a duct to supply fluid to said cylinder at a point between the aforesaid points and a duct communicating with said cylinder and opening upwardly into said housing; a piston valve in said cylinder having heads spaced apart to cover simultaneously the openings of the first mentioned two ducts into said cylinder, means to connect said valve to operating devices, and a cylinder in which said piston is slidable.

RALPH ERLING.